United States Patent
Berta

(10) Patent No.: US 6,433,063 B1
(45) Date of Patent: *Aug. 13, 2002

(54) DIRECTLY PAINTABLE THERMOPLASTIC OLEFIN COMPOSITION WITH IMPROVED CONDUCTIVITY

(75) Inventor: Dominic A. Berta, Newark, DE (US)

(73) Assignee: Basell Technology Company BV (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/607,689

(22) Filed: Jun. 30, 2000

(51) Int. Cl.$^7$ ............................. C08L 23/00; C08L 23/26
(52) U.S. Cl. ..................... 524/487; 524/488; 524/504
(58) Field of Search ........................ 524/487, 488, 524/489, 504; 525/193, 194, 195, 240

(56) References Cited

U.S. PATENT DOCUMENTS

| | | |
|---|---|---|
| 3,361,849 A | 1/1968 | Cramer et al. |
| 3,666,836 A | 5/1972 | John |
| 5,143,978 A | 9/1992 | Berta ........................ 525/240 |
| 5,302,454 A | 4/1994 | Cecchin et al. ............ 428/402 |
| 5,344,881 A | 9/1994 | Yamamoto et al. |
| 5,360,868 A | 11/1994 | Mosier et al. ............... 525/89 |
| 5,484,838 A | 1/1996 | Helms et al. ............... 524/496 |
| 5,486,419 A | 1/1996 | Clementini et al. ......... 428/397 |
| 5,589,544 A | 12/1996 | Horrion |
| 5,962,573 A | 10/1999 | Berta ........................ 524/487 |

FOREIGN PATENT DOCUMENTS

| | | |
|---|---|---|
| EP | 0934975 | 8/1999 |
| EP | 0936246 | 8/1999 |

OTHER PUBLICATIONS

Hercules Method R 25–3 Softening Point ( Thermometer Drop Method) (1993).
American Oil Chemistry Society Offical Method L 8a–57 (Date Unavailable).

*Primary Examiner*—Jeffrey Mullis

(57) ABSTRACT

Directly paintable polymer compositions contain (1) a thermoplastic olefin, (2) a propylene homopolymer or propylene copolymer with ethylene or a $C_{4-8}$ α-olefin, grafted with an anhydride of an aliphatic α,β-unsaturated dicarboxylic acid, (3) an oxidized polyethylene wax having a melting point of less than 116° C. and an acid number of less than 40, (4) a functionalized polymer that reacts with the anhydride groups of the grafted polymers, (5) an epichlorohydrin rubber and, optionally, (6) a polyolefin rubber grafted with an anhydride of an aliphatic α,β-unsaturated dicarboxylic acid, (7) an ethylene polymer grafted with an anhydride of an aliphatic α,β-unsaturated dicarboxylic acid, (8) a thermoplastic resin, and (9) an organic sulfonic acid salt of a group I or II metal, or mixtures thereof, the compositions are particularly suitable for electrostatic painting.

11 Claims, No Drawings

DIRECTLY PAINTABLE THERMOPLASTIC OLEFIN COMPOSITION WITH IMPROVED CONDUCTIVITY

FIELD OF THE INVENTION

This invention relates to directly paintable thermoplastic olefin compositions comprising an epichlorohydrin rubber; said compositions have improved electrical conductivity and therefore are particularly suitable to electrostatic painting. The TPO compositions of the invention are useful for making injection molded parts, such as automobile bumpers, and exhibit excellent paint adhesion and durability.

BACKGROUND OF THE INVENTION

Thermoplastic olefins (TPOS) are uncrosslinked blends of olefin polymers and polyolefin elastomers. They can be made by physically blending in an internal mixer, or by polymerizing in a reactor. These materials are not paintable or coatable, because the paints or coatings consist of polar materials like urethanes, acrylics, epoxies, or melamines that have very poor adhesion to non-polar materials like polyolefins. Typically an adhesion promoter is used as the tie layer between the TPO substrate and the paint coating. This extra step adds to the cost of the product, and the coating is not very durable.

U.S. Pat. No. 5,962,573 discloses a directly paintable polymer composition comprising: (1) a thermoplastic olefin, (2) a propylene homopolymer or a propylene copolymer with ethylene or a $C_{4-8}$ α-olefin, grafted with an anhydride of an aliphatic α,β-unsaturated dicarboxylic acid; (3) an oxidized polyethylene wax having a melting point of less than 116° C. and an acid number of less than 40; (4) a functionalized polymer that is reactive with the anhydride groups of the grafted polymers and, optionally, (5) a polyolefin rubber grafted with an anhydride of an aliphatic α,β-unsaturated dicarboxylic acid, and (6) an ethylene polymer grafted with an anhydride of an aliphatic α,β-unsaturated dicarboxylic acid.

Injections molded parts such as automobile bumpers made from this composition are directly paintable with polar paints or coatings without the need for a layer of adhesion promoter between the thermoplastic olefin surface and the paint, and exhibit good paint adhesion an durability.

An important parameter in the paint process is the efficiency of the paint being sprayed; in fact, since the paint is airborne, some of it does not arrive onto the part to be treated and some is lost in the environment. Electrostatic painting of substrates tends to reduce paint waste and emissions, as compared to non-electrostatic painting techniques.

Electrostatic painting techniques require the substrate to be electrically conducting and common TPOs for injection molded articles are electrically insulating; one of the methods to solve this problem, according to the prior art, consists in applying an electrically conductive primer prior to painting, in order to display an increased paint transfer efficiency. Nevertheless, this further step is costly and time consuming.

An alternative technique is to use a grounding clip, but this causes higher film buildup near the grounding clip with film buildup decreasing as the distance from the grounding clip increases. In addition, after several passes through the paint spraying booth, significant resistance to ground may be encountered due to multiple paint layers on the substrate itself A further way of improving the electrical conductivity is to incorporate additives, such as stainless steel fibers, into the thermoplastic polymer itself; nevertheless said additives are not suitable for TPO-based compositions because they lead to a degradation of their desirable mechanical properties, such as impact strength and tensile elongation. Moreover, said additives significantly increase the brittleness of such TPO compositions.

U.S. Pat. No. 5,484,838 describes thermoplastic olefin compositions having improved electrical conductivity due to the addition of electrically conductive carbon black; in these compositions, at least a portion of the carbon black has to be dispersed within the crystalline polymer component of the TPO. Nevertheless, carbon black or additives of similar nature are difficult to handle and, as a consequence. their exact dispersion and the morphology needed for the TPO matrix are very difficult to control.

In addition, conductive carbon black may cause a reduction in the effectiveness of the directly paintable functionalized polymers, presumably by absorbing the materials onto the surface of the carbon black itself.

Thus, there is still a need for a TPO composition having an improved electrical conductivity and therefore allowing a better paint efficiency, at the same time meeting the stringent requirements for paint adhesion and durability of today's marketplace, particularly in the automotive industry.

SUMMARY OF THE INVENTION

The composition of the present invention comprises, by weight:

(1) 100 parts of a thermoplastic olefin comprising an olefin polymer having an isotactic index of at least 80 and an olefin polymer rubber, the thermoplastic olefin having a rubber content of at least 20%;

(2) about 5 to about 20 parts per hundred parts of the thermoplastic olefin of a propylene homopolymer or propylene copolymer with ethylene or a $C_{4-8}$ α-olefin having an ethylene or α-olefin content of about 0.5% to about 20%, grafted with an anhydride of an aliphatic α,β-unsaturated dicarboxylic acid and having an anhydride content of about 2% to about 5%;

(3) about 3 to about 20 parts per hundred parts of the thermoplastic olefin of an oxidized polyethylene wax having a melting point of less than 116° C. and an acid number of less than 40;

(4) a functionalized polymer that is reactive with the anhydride groups of the grafted polymers, selected from the group consisting of:
   (a) about 2 to about 6 parts per hundred parts of the thermoplastic olefin of an amine-terminated polyalkylene glycol;
   (b) about 2 to about 6 parts per hundred parts of the thermoplastic olefin of a hydroxy-terminated polyolefin;
   (c) about 2 to about 6 parts per hundred parts of the thermoplastic olefin of a hydroxy-terminated polybutadiene;
   (d) about 2 to about 8 parts per hundred parts of the thermoplastic olefin of a hydroxy-terminated olefin/alkylene oxide copolymer;
   (e) about 2 to about 8 parts per hundred parts of the thermoplastic olefin of a hydroxy-terminated polyalkylene oxide;
   (f) about 2 to about 8 parts per hundred parts of the thermoplastic olefin of a methoxy-terminated polyalkylene oxide;
   (g) about 2 to about 8 parts per hundred parts of the thermoplastic olefin of an amine-terminated olefin/alkylene oxide copolymer, and
   (h) mixtures thereof;

(5) about 2 to about 20 parts per hundred parts of the thermoplastic olefin of an epichlorohydrin rubber;

(6) optionally, about 5 to about 30 parts per hundred parts of the thermoplastic olefin of a polyolefin rubber grafted with an anhydride of an aliphatic α,β-unsaturated dicarboxylic acid, having an anhydride content of at least 0.3% but less than 3% and comprising a polymer of ethylene and a $C_{3-8}$ α-olefin, optionally containing about 0.5% to about 10% of a diene, having an ethylene content of about 30% to about 70%;

(7) optionally, about 5 to about 20 parts per hundred parts of the thermoplastic olefin of an ethylene polymer grafted with an anhydride of an aliphatic α,β-unsaturated dicarboxylic acid, having an anhydride content of about 1% to about 16% and a number average molecular weight Mn of about 500 to about 5000, provided that at least 5 parts of anhydride-grafted polypropylene or propylene copolymer and 3 parts of oxidized polyethylene wax per hundred parts of the thermoplastic elastomer are also present;

(8) optionally, about 5 to about 20 parts per hundred parts of the thermoplastic olefin of a thermoplastic resin selected from the group consisting of:
  (a) an hydrogenated polymer consisting essentially of terpene hydrocarbons, having a drop softening point greater than about 70° C., and a number average molecular weight $M_n$ greater than about 500; and
  (b) an hydrogenated polymer of styrene or alkyl-substituted styrene, having a number average molecular weight $M_n$ ranging between about 600 and about 20,000; and (9) optionally, about 0.1 to about 5 parts per hundred parts of the thermoplastic olefin of an organic sulfonic acid salt of a group I or II metal of the Periodic Table of the Elements (IUPAC version).

Injection molded parts, such as automobile bumpers, made from this composition have an increased conductivity and are particularly suitable for electrostatic painting. Such parts are directly paintable with polar paints or coatings with much higher paint efficiency with respect to the prior art compositions, molded parts do not require the use of a layer of adhesion promoter between the thermoplastic olefin surface and the paint, and exhibit excellent paint adhesion and durability.

Moreover, with respect to the compositions of the prior art, as described in U.S. Pat. No. 5,484,838, the composition of the invention does not display the problems associated with the use of carbon black, since epichlorohydrin rubbers are easy to handle and can be readily dispersed in the TPO matrix.

Finally, the addition of an epichlorohydrin rubber to the TPO composition does not alter the favorable mechanical properties of the composition itself.

A further object of the present invention is a molded thermoplastic article comprising a composition as described above, and more particularly a molded thermoplastic automotive article comprising a composition as described above.

DETAILED DESCRIPTION OF THE INVENTION

Component (1) of the composition of this invention is a thermoplastic olefin comprising a crystalline olefin polymer and an olefin polymer rubber, the thermoplastic olefin having a rubber content of at least 20%. Suitable thermoplastic olefins include, for example,
  (a) a composition comprising, by weight,
    (i) about 10% to about 60%, preferably about 20% to about 50%, of a propylene homopolymer having an isotactic index greater than 90, preferably between 95 and 98, or a crystalline propylene copolymer with ethylene and/or a $C_{4-8}$ α-olefin having a propylene content greater than 85% and an isotactic index of greater than 85;
    (ii) about 30% to about 60%, preferably about 30% to about 50%, of an amorphous ethylene-propylene or ethylene-butene copolymer, optionally containing about 1% to about 10% of a diene, which is xylene soluble at room temperature and has an ethylene content of about 30% to about 70%;
    (iii) about 2% to about 20%, preferably about 7% to about 15%, of a semi-crystalline ethylene-propylene or ethylene-butene copolymer that is xylene insoluble at room temperature and has an ethylene content of greater than 75% but less than 92%; and
    (iv) about 5% to about 20%, preferably about 7% to about 15%, of an ethylene polymer having a density of 0.91 to 0.96 g/cm$^3$ and a melt index of 0.1 to 100 g/10 min, preferably about 15 to about 50 g/10 min. Ethylene homopolymer is preferred. However, copolymers containing 8% or less of an α-olefin comonomer can also be used.
  (b) a composition comprising, by weight:
    (i) about 20% to about 70%, preferably about 50% to about 70%, of a crystalline propylene homopolymer having an isotactic index greater than 90, preferably between 95 and 98, or a crystalline propylene copolymer with ethylene and/or a $C_{4-8}$ α-olefin having a propylene content greater than 85% and an isotactic index of greater than 85;
    (ii) about 20% to about 75%, preferably about 30% to about 50%, most preferably about 30% to about 35%, of an amorphous copolymer of ethylene selected from the group consisting of (1) ethylene/propylene, (2) ethylene/butene-1, (3) ethylene/octene-1, and (4) mixtures thereof, optionally containing about 1% to about 10%, preferably about 1% to about 4%, of a diene, which is xylene soluble at room temperature and has an ethylene content of about 30% to about 70%, preferably about 40% to about 60%; and
    (iii) about 2% to about 30%, preferably about 2% to about 10%, most preferably about 2% to about 5%, of a semi-crystalline copolymer of ethylene selected from the group consisting of (1) ethylene/propylene, (2) ethylene/butene-1, (3) ethylene/octene-1, and (4) mixtures thereof, which is xylene insoluble at room temperature and has an ethylene content of greater than 90%;
  (c) a composition comprising, by weight,
    (i) at least one heterophasic polyolefin composition comprising:
      (1) about 90% to about 55% of a propylene polymer material selected from the group consisting of a propylene homopolymer having an isotactic index greater than 90, and a crystalline copolymer of propylene and an α-olefin of the formula $CH_2=CHR$, where R is H or $C_2-C_6$ alkyl, the α-olefin being less than 10% of the copolymer, and
      (2) about 10% to about 45% of an elastomeric copolymer of propylene and an α-olefin of the formula $CH_2=CHR$, where R is H or $C_2-C_6$ alkyl, the α-olefin being about 50% to about 70% of the elastomeric copolymer, and about 10% to about 40% of the elastomeric copolymer being insoluble in xylene at ambient temperature, and (ii) about 5 to about 50 parts, preferably about 10 to about 30 parts, and most preferably about 10 to about 25 parts, per hundred parts of (c)(i) of an elastomeric copolymer of ethylene and a $C_{3-8}$ α-olefin made with a metallocene catalyst. If more than one heterophasic polyolefin (c)(i) is present, the heterophasic polyolefins can be combined in any proportion.

(d) a composition comprising, by weight:
(i) about 30% to about 50%, preferably about 35% to about 45%, of a propylene homopolymer having an isotactic index greater than 90, and
(ii) about 70% to about 50%, preferably about 65% to about 55%, of an olefin polymer composition comprising:
(1) about 25% to about 50% of a crystalline propylene homopolymer with a solubility in xylene at room temperature of less than or equal to 4%, or a crystalline copolymer of propylene with ethylene or a $C_{4-8}$ α-olefin having an ethylene or α-olefin content of about 0.5% to about 3%, and a solubility in xylene at room temperature of less than or equal to 4%, and
(2) about 50% to about 75% of an amorphous copolymer of ethylene and a $C_{4-8}$ α-olefin, wherein the α-olefin content is about 10% to about 20%, and the copolymer is about 10% to about 40% soluble in xylene at room temperature; and (e) a composition comprising, by weight:
(i) about 80% to about 30%, preferably about 70% to about 50%, of a propylene homopolymer having an isotactic index greater than 90, and
(ii) about 20% to about 70%, preferably about 30% to about 50%, of an elastomeric copolymer of ethylene and a $C_{3-8}$ α-olefin, optionally containing about 1% to about 10%, preferably about 1% to about 4%, of a diene, and having an ethylene content of about 30% to about 70%, preferably about 40% to about 60%.

Thermoplastic olefins (a) and (c) are preferred.

Thermoplastic olefins (a) and (b) and compositions (c)(i) and (d)(ii) are typically prepared by sequential polymerization in at least two stages. Alternatively, the components can be prepared separately and then blended together by melt-kneading or melt blending. The polymerization conditions and the polymerization catalyst are described in more detail in U.S. Pat. Nos. 5,143,978; 5,302,454; 5,360,868; and 5,486,419, which are incorporated herein by reference. Sequential polymerization is preferred.

For TPO (a), (i) can be made in the first reactor, (ii) and (iii) in the second reactor, and (iv) in the third reactor. Alternatively, (iv) can be made in the second reactor and (ii) and (iii) in the third reactor.

For TPO (b), (i), (ii), and (iii) are preferably formed in a reactor or series of reactors in at least two stages by first polymerizing propylene to form (i) and then polymerizing ethylene and propylene, butene-1, or octene-1, or mixtures thereof, in the presence of (i) and the catalyst used in the first stage to form (ii) and (iii). The polymerization can be conducted in the liquid or gas phase or in liquid-gas phase.

For TPO (b), (i) can be prepared using a Ziegler-Natta catalyst or a mixture of Ziegler-Natta and metallocene catalysts. Components (ii) and (iii) can be prepared using Ziegler-Natta or metallocene catalysts or a combination of the two, with one type of catalyst being used for one stage and the other type of catalyst being used for the next stage when the TPO is made by sequential polymerization.

The $C_{4-8}$ α-olefins useful in the preparation of the thermoplastic olefins include, for example, butene-1; pentene-1; hexene-1; 4-methylpentene-1, and octene-1.

The diene, when present, is typically a butadiene; 1,4-hexadiene; 1,5-hexadiene, or ethylidenenorbornene.

Component (2) is a propylene homopolymer or propylene copolymer with ethylene or a $C_{4-8}$ α-olefin, grafted with an anhydride of an aliphatic α,α-unsaturated dicarboxylic acid and having an ethylene or α-olefin content of about 0.5% to about 20%, preferably about 1% to about 10%, and most preferably about 1% to about 5%. The polymer has an anhydride content of about 2% to about 5%, preferably about 3% to about 4%, and preferably has a number average molecular weight $M_n$ of about 2500 to about 25,000, more preferably about 3000 to about 10,000. Maleic anhydride is the preferred anhydride. Component (2) is present in an amount of about 5 to about 20 parts, preferably about 8 to about 16 parts, most preferably about 10 to about 14 parts, per hundred parts of the thermoplastic olefin.

Component (3) is an oxidized polyethylene wax having a melting point of less than 116° C. and an acid number of less than 40. The oxidized wax is present in an amount of about 3 to about 20 parts, preferably about 5 to about 15 parts, most preferably about 5 to about 10 parts, per hundred parts of the thermoplastic polyolefin, whether or not the anhydride-grafted olefin polymer rubber (6) is present.

Component (4) is a functionalized polymer that is reactive with the anhydride groups of the grafted polymers (2) and, when present, components (6) and (7), selected from the group consisting of (a) an amine-terminated polyalkylene glycol, (b) a hydroxy-terminated polyolefin, (c) a hydroxy-terminated polybutadiene, (d) hydroxy-terminated olefin/alkylene oxide copolymers, (e) hydroxy-terminated polyalkylene oxides, (f) methoxy-terminated polyalkylene oxides, (g) amine-terminated olefin/alkylene oxide copolymers, and (h) mixtures thereof.

Component (4)(a), when present, is used in an amount of about 2 to about 6 parts, preferably about 2 to about 4 parts, per hundred parts of the thermoplastic olefin. The polyalkylene glycol can be, for example, polyethylene glycol, polypropylene glycol, copolymers of ethylene glycol and propylene glycol, poly(1,2-butylene glycol), and poly(tetramethylene glycol).

Component (4)(b), when present, is used in an amount of about 2 to about 6 parts, preferably about 2 to about 4 parts, per hundred parts of the thermoplastic olefin. Polyethylene is the preferred polyolefin, although polypropylene, polybutene, and copolymers of ethylene and another α-olefin can also be used.

Component (4)(c), when present, is used in an amount of about 2 to about 6 parts, preferably about 2 to about 4 parts, per hundred parts of the thermoplastic olefin.

Component (4)(d), when present, is used in an amount of about 2 to about 8 parts, preferably about 2 to about 6 parts, per hundred parts of the thermoplastic olefin. An ethylene/ethylene oxide copolymer is preferred, although other copolymers such as ethylene/propylene oxide, propylene/ethylene oxide, butene/ethylene oxide, and butene/propylene oxide copolymers can also be used. The amount of alkylene oxide can be from about 10% to about 99.9%, preferably about 50% to about 98%, and most preferably about 75% to about 95%, based on 100% of the copolymer.

Component (4)(e), when present, is used in an amount of about 2 to about 8 parts, preferably about 2 to about 6 parts, per hundred parts of the thermoplastic olefin. Polyethylene oxide is preferred; however, polypropylene oxide, copolymers of ethylene oxide and propylene oxide, poly(1,2-butylene oxide), and poly(tetramethylene oxide) can also be used.

Component (4)(f), when present, is used in an amount of about 2 to about 8 parts, preferably about 2 to about 6 parts, per hundred parts of the thermoplastic olefin. Suitable polyalkylene oxides are those described for component (4)(e).

Component (4)(g), when present, is used in an amount of about 2 parts to about 8 parts, preferably about 2 to about 6 parts, per hundred parts of the thermoplastic olefin. The amount of alkylene oxide can be about 10% to about 99.9%, preferably about 50% to about 98%, and most preferably about 75% to about 95%. Examples of suitable olefin/alkylene oxide copolymers are described for component (4)(d).

When using a combination of functionalized polymers, the amount of each component can vary widely from about 0.1% to about 99.9% of each, based on the total amount of functionalized polymers. It is preferred that one component be present in an amount of >50%, preferably >60%, based on the total amount of functionalized polymers.

Instead of adding the functionalized polymer directly to the thermoplastic olefin, an adduct of the functionalized polymer and the anhydride-grafted polypropylene or ethylene/propylene copolymer can be prepared separately, then blended with the thermoplastic olefin.

Component (5) is an epichlorohydrin rubber; suitable epichlorohydrin rubbers include:
(5)(a) homopolymers of epichlorohydrin;
(5)(b) copolymers of epichlorohydrin with from about 1% to about 30% by mole of a saturated epoxy monomer or of an unsaturated epoxy monomer; and
(5)(c) terpolymers of epichlorohydrin with from about 1% to about 30% by mole of a saturated epoxy monomer and an unsaturated epoxy monomer; more preferably, the amount of such saturated epoxy monomer ranges from about 1 to about 10% by mole. Said epichlorohydrin rubbers generally have high molecular weights, density values ranging from about 1.35 g/cm$^3$ to about 1.38 g/cm$^3$, and a Mooney viscosity after 4 minutes at 212° F. of from about 40 to about 80 ML. These rubbers can evidence certain degrees of crystallinity.

The epichlorohydrin rubbers may be prepared according to the methods known in the state of the art, for instance by polymerizing monomeric epichlorohydrin alone or together with one or more of the above-mentioned epoxy monomers in the presence of suitable catalysts, such as organometallic catalysts.

Typical saturated epoxy monomers include alkylene oxides, such ethylene oxide and propylene oxide, and typical unsaturated epoxy monomers include allylglycidyl ether.

The epichlorohydrin rubber is present in an amount of about 2 to about 20 parts, preferably about 5 to about 15 parts, most preferably about 10 parts, per hundred parts of the thermoplastic polyolefin.

Optional component (6) is an olefin polymer rubber grafted with an anhydride of an aliphatic α,β-unsaturated dicarboxylic acid and comprising a polymer of ethylene and a $C_{3-8}$ α-olefin, optionally containing about 0.5% to about 10% of a diene, preferably about 2% to about 6%. The anhydride-grafted polyolefin rubber has an ethylene content of about 30% to about 70%, preferably about 40% to about 60%, and has an anhydride content of at least 0.3% but less than 3%. Maleic anhydride is the preferred anhydride. When present, the anhydride-grafted rubber is used in an amount of about 5 to about 30 parts, preferably about 5 to about 15 parts, most preferably about 5 to about 12 parts, per hundred parts of the thermoplastic olefin.

Optional component (7) is an ethylene polymer grafted with an anhydride of an aliphatic α,α-unsaturated dicarboxylic acid and having an anhydride content of about 1% to about 16% by weight, preferably about 2% to about 13%, most preferably about 3% to about 13%. Maleic anhydride is the preferred anhydride. Ethylene homopolymer is preferred. However, copolymers containing 10% or less of an α-olefin comonomer can also be used. The ethylene polymer preferably has a number average molecular weight $M_n$ of about 500 to about 5000, preferably about 600 to about 2000, most preferably about 600 to about 1000. When component (6) is used, it is present in an amount of about 5 to about 20 parts, preferably about 5 to about 10 parts, per hundred parts of the thermoplastic olefin, provided that at least 5 parts of anhydride-grafted polypropylene or propylene copolymer and 3 parts of oxidized polyethylene wax per hundred parts of the thermoplastic olefin are also present.

Optional component (8) is a thermoplastic resin selected from the group consisting of:
(a) an hydrogenated polymer consisting essentially of terpene hydrocarbons, having a drop softening point greater than about 70° C., and a number average molecular weight greater than about 500; and
(b) an hydrogenated polymer of styrene or alkyl-substituted styrene, having a number average molecular weight $M_n$ ranging between about 600 and about 20,000.

Components (8)(a) are amorphous terpene hydrocarbons polymers, preferably having a drop softening point greater than about 100° C. The softening point of the polymers is the temperature (°C.) at which the polymer changes from a rigid to a soft state, as determined by the Hercules drop method (described in the Hercules report entitled "The Hercules Drop Method for Determining the Softening Point of Rosins and Modified Rosins". No. Herc. 400-431C, 1955). Components (8)(a) have preferably a number average molecular weight $M_n$ greater than about 600 and a iodine value of less than about 50, and even more preferably a iodine value of less than about 15. The iodine value of the hydrocarbon polymers was determined in accordance with Method No. L 8a-57 of the American Oil Chemistry Society.

These amorphous terpene hydrocarbons polymers include the polymers produced by the hydrogenation of the resinous polymerization products obtained by the catalytic polymerization of mixed unsaturated monomers derived from the deep cracking of petroleum, as well as higher polymers obtained by polymerization and/or copolymerization of terpene hydrocarbons, followed by hydrogenation under pressure. Suitable components (8)(a) and the process for their preparation are described in U.S. Pat. No. 3,361,849, which is incorporated herein by reference.

Component (8)(b) is an hydrogenated polymer of styrene or alkyl-substituted styrene, having a number average molecular weight Mn ranging between about 600 and about 20,000.

By "hydrogenated polymer of styrene or alkyl-substituted styrene" is meant a polymer selected from the group consisting of homopolymers of styrene and alkyl-substituted styrenes, copolymers of styrene and alkyl-substituted styrenes with each other, and copolymers of styrene and alkyl-substituted styrenes with other hydrocarbons having non-aromatic carbon-to-carbon unsaturations, said polymer being characterized by having at least 50% of its aromatic unsaturations hydrogenated, preferably at least 70% of its aromatic unsaturations hydrogenated, and a number average molecular weight $M_n$ ranging from 600 to 20,000; said polymers have preferably a drop softening point between about 70° and 170° C.

Suitable components (8)(b) and the process for their preparation are described in U.S. Pat. No. 3,666,836, which is incorporated herein by reference.

When present, the thermoplastic resin (8) is used in an amount of about 5 to about 20 parts, preferably about 8 to about 6, most preferably about 10 to about 14 per hundred parts of the thermoplastic olefin.

Optional component (9) is an organic sulfonic acid salt of a group I or II metal of the Periodic Table of the Elements (IUPAC version).

Suitable organic sulfonic acids are sulfonic acids bearing a radical selected from saturated or unsaturated, linear or cyclic $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table of the Elements (new IUPAC notation), such as B, N, P, Al, Si, Ge, O, S, Cl and F; more preferably, said radical is selected from the group consisting of trifluoromethyl, benzene, $C_1$–$C_5$ alkyl-benzene, naphthalene and $C_1$–$C_5$ alkyl-naphthalene.

Preferred metals belong to group I, and more preferably are selected from the group consisting of Li, Na and K.

When present, the organic sulfonic acid salt is used in an amount of about 0.1 to about 5 parts, preferably about 0.5 to about 1.5 per hundred parts of the thermoplastic olefin.

According to a preferred embodiment, the directly paintable polymer compositions of the present invention contain at least one of the components selected from the components (6), (7), (8) and (9) described above.

The composition of the present invention can also contain other conventional additives, for example, antioxidants; stabilizers; extender oils such as paraffinic and naphthenic oils; fillers such as $CaCO_3$, talc, $Al_2O_3$, carbon black, and zinc oxide; or flame retardants.

If non-polymeric additives such as conductive or non-conductive carbon black are used, they are preferably added after the functionalized polymer has reacted with the anhydride-grafted polymers. The additives can also be added as a dispersion in a polymer, preferably an olefin polymer.

The compounding or melt blending of the components of the composition can be carried out on an open roll, in an internal mixer (Banbury or Haake mixers), or in single-screw or twin screw extruders.

The compositions of this invention can be formed in any way, such as by extrusion, compression molding, and thermoforming; injection molding is preferred. They can also be co-extruded or co-injection molded with other polyolefin materials such as propylene homopolymers, copolymers, and graft copolymers, ethylene homopolymers and copolymers, or thermoplastic olefins such as those described previously. They can also be co-extruded or co-injection molded with olefin-based dynamically vulcanized elastomers or olefin-compatible thermoplastic elastomers such as styrene/butadiene copolymers.

The compositions of the present invention show an increased electrical conductivity; in fact, the volume resistivity, determined by ASTM D257 method, is preferably lower than about $1·10^{15}$ ohm·cm, and more preferably lower than about $5·10^{14}$ ohm·cm. As described above, the epichlorohydrin rubber component in the compositions of the invention leads to a significant electrical conductivity increase, without detrimental impact on the chemical/physical properties of the thermoplastic compositions; this significant increase is critical for reaching electrical dissipating molded articles.

The compositions according to the present invention can be used to make a variety of articles, such as automotive fascia, rocker panels, spoilers, bumpers and other vehicle exterior or interior trim components. Since the compositions of the present invention have an increased electrical conductivity, they are particularly suitable for articles which are subject to painting.

General Procedures and Characterizations

Paint Adhesion Test and Durability Test

The specimens for testing were prepared using a pin-gated mold rather than the fan-gated mold typically used for molding thermoplastic olefins. Durability depends upon the paint thickness; the thicker the paint or film, the better the durability. In the following examples and comparative examples only one coat of paint was used with an approximately 1.2 mil ($3.048·10^{-5}$ m) film thickness, which is a very severe test. A typical durability test used in the automotive industry also employs a top coat that has a low coefficient of friction, which reduces the severity of the test; no top coat was used in the following examples and comparative examples.

The samples for testing were prepared by dry blending the ingredients and reactive mixing in a twin screw extruder at a temperature of 450° F. (232° C.) and pelletizing the resultant material. The pellets were injection molded into disks that were painted with about a 1.2 to 2 mil ($3.048·10^{-5}$ to $5.0·10^{-5}$ m) thick coating using DuPont 872 white paint and cured at 250° F. (121° C.) for thirty minutes. A lattice pattern of squares with each square about ¼ inch in size was scribed on the painted disk at the end opposite the gate area of the disk. Adhesive tape (3M 898) was pressed onto the paint and pulled off to test the amount of paint removed or the paint adhesion. The % failure was recorded as the % of the squares removed by the tape after one pull. The durability was determined by using a Taber abrader with a type C scuffing head assembly and a one pound load. The painted disk was placed in an oven at 70° C. for one hour, removed and placed on the platform of the abrader. The scuffing head was placed in contact with the painted surface and the disk was rotated for a specified number of cycles. The amount of paint removed from the complete circumference subtended by the scuffing head was recorded as the % failure. The criteria set for acceptable paint adhesion were <50% failure in the gate area of the disk and <10% in the area opposite the gate area after the first pull, and <85% failure in the gate area and <50% in the area opposite the gate after the fifth pull.

The criteria for satisfactory durability was <50% failure after 100 cycles.

Volume Resistivity Test

Volume Resistivity was measured according to ASTM D257 method, with a time of electrification equal to 5 seconds; acceptable values for volume resistivity are lower than $1·10^{15}$ ohm·cm.

In this specification all parts and percentages are by weight unless otherwise noted. The following examples are given for illustrative and not limiting purposes.

EXAMPLES 1–2 and

Comparative Examples 1–2

Examples 1 and 2 show the paint adhesion, durability and volume resistivity of compositions containing a thermoplastic olefin (TPO), a maleic anhydride-grafted polypropylene (MA-g-PP), an oxidized polyethylene wax, an amine-terminated polyethylene oxide (ATPEO) or an hydroxy-terminated ethylene/ethylene oxide copolymer (HO-E/EO), an epichlorohydrin rubber and a maleic anhydride-grafted polyolefin rubber (MA-g-rubber). The effect of the presence of the epichlorohydrin rubber, according to the composition of the invention, on the electrical conductivity of the compositions is demonstrated by the results shown in Table 1. Moreover, these results demonstrate that good levels of paint adhesion and durability are obtained with the compositions of the invention.

In Table 1, the TPO contained 55% propylene homopolymer, 3% semi-crystalline ethylene/propylene copolymer that had a propylene content of ~10% and was insoluble in xylene at room temperature (~23° C.), 30% amorphous ethylene/propylene copolymer rubber that had an ethylene content of 50% and was soluble in xylene at room temperature, and 12% ethylene homopolymer having a melt index of about 50 g/10 min (ASTM-D1238, at 190° C. and 2.16 Kg).

MA-g-PP was Epolene E-43 maleic anhydride-modified polypropylene wax, commercially available from Eastman Chemical Company.

The oxidized polyethylene wax was Petrolite C-3500 wax, commercially available from Petrolite Corporation and has the following properties: acid no=24, Mn=1,500, viscosity=30 cp at 149° C., Melt Index=5,000 g/10 min, and Melting Point=96° C.

The ATPEO was XTJ-418 monoamine-terminated polyethylene oxide, commercially available from Huntsman Corporation.

The HO-E/EO was Unithox 480 hydroxy-terminated ethylene/ethylene oxide copolymer, having $M_n$ of 2250 and a hydroxyl number of 22, and is commercially available from Petrolite Corporation.

The epichlorohydrin rubber was Hydrin T, epichlorohydrin terpolymer with ethyleneoxide and allyglycidyl ether, commercially available from Zeon Chemicals, Inc.

The MA-g-rubber was Exxelor VA-1803, ethylene/propylene rubber containing 0.7% grafted maleic anhydride, commercially available from Exxon Chemical Company.

The antioxidant was Irganox B 225, a blend of 1 part Irganox 1010 tetrakis [methylene(3,5-di-tert-butyl-4-hydroxyhydrocinnamate)methane and 1 part Irgafos 168 tris(2,4-di-tert-butylphenyl) phosphite antioxidant, commercially available from CIBA Specialty Chemicals Company.

when an epichlorohydrin rubber is used along with the TPO, MA-g-PP, oxidized polyethylene wax, ATPEO, hydroxy-terminated E/EO and MA-g-rubber. Moreover, the presence of an epichlorohydrin rubber does not affect paint adhesion and durability.

In Comparative Example 1, the composition comprises the same TPO as used in Examples 1 and 2 but does not contain an epichlorohydrin rubber, while Comparative Example 2 comprises a prior art TPO composition, as described in U.S. Pat. No. 5,962,573, which not containing an epichlorohydrin rubber; as evident from results reported in Table 1, both these compositions do not show acceptable electrical conductivity properties.

EXAMPLES 3–5

These Examples show the paint adhesion, durability and volume resistivity of compositions containing a thermoplastic olefin (TPO), a maleic anhydride-grafted polypropylene (MA-g-PP), an oxidized polyethylene wax, an amine-terminated polyethylene oxide (ATPEO) or an hydroxy-terminated ethylene/ethyleneoxide copolymer (HO-E/EO), an epichlorohydrin rubber, a maleic anhydride-grafted polyethylene (MA-g-PE), and a thermoplastic resin.

The effect of the presence of the epichlorohydrin rubber, according to the composition of the invention, on the volume resistivity of the compositions is demonstrated by the results shown in Table 2. Moreover, these results demonstrate that good levels of paint adhesion and durability are obtained with the compositions of the invention.

In Table 2, the TPO, the MA-g-PP, the oxidized PE wax, the ATPEO, the HO-E/EO, the epichlorohydrin rubber and the antioxidant were the same as in Examples 1–2 and Comparative Examples 1–2.

The MA-g-PE was Ceramer 1608, maleic anhydride-grafted polyethylene, having $M_n$ of 700, a maleic anhydride content of 12.7% by weight, and a melting point of 121° C., commercially available from Petrolite Corporation.

The acid resin was Foral AX, thermoplastic acid resin produced by hydrogenating wood rosin to a high degree, having a weight average molecular weight $M_w$ of 300 and an acid number of at least 158, commercially available from Hercules Incorporated.

TABLE 1

|  | Ex. 1 | Ex. 2 | Comp. Ex. 1 | Comp. Ex. 2 |
|---|---|---|---|---|
| TPO | 100 | 100 | 100 | 100 |
| MA-g-PP | 10 | 10 | — | 10 |
| Oxidized PE wax | 10 | 10 | — | 10 |
| ATPEO | 3 | — | — | 3 |
| OH-E/EO | — | 3 | — | — |
| Epichlorohydrin rubber | 10 | 10 | — | — |
| MA-g-rubber | 10 | 10 | — | 10 |
| Antioxidant | 0.2 | 0.2 | — | 0.2 |
| Paint Adhesion (% Failure) | (g/op) | (g/op) | (g/op) | (g/op) |
| $1^{st}$ pull | 0/0 | 0/0 | 100 | 0/0 |
| $3^{rd}$ pull | 0/0 | 0/0 | n.d. | 0/0 |
| $5^{th}$ pull | 4/0 | 0/0 | n.d. | 0/0 |
| Durability (% Failure) |  |  |  |  |
| 25 cycles | 0 | 0 | 100 | 0 |
| 100 cycles | 0 | 0 | n.d. | 0 |
| Volume Resistivity (ohm · cm) | $6.0 \cdot 10^{13}$ | $2.0 \cdot 10^{14}$ | $2.0 \cdot 10^{16}$ | $1.2 \cdot 10^{16}$ | n.d. = not determined

Examples 1 and 2 show the improvement in electrical conductivity, as shown by the volume resistivity values,

TABLE 2

|  | Ex. 3 | Ex. 4 | Ex. 5 |
|---|---|---|---|
| TPO | 100 | 100 | 100 |
| MA-g-PP | 10 | 10 | 10 |
| Oxidized PE wax | 10 | 10 | 10 |
| ATPEOP | 4 | — | — |
| OH-E/EO | — | 4 | 4 |
| Epichlorohydrin rubber | 10 | 10 | 10 |
| Ma-g-PE | 10 | 10 | — |
| Acid resin | — | — | 10 |
| Antioxidant | 0.2 | 0.2 | 0.2 |
| Paint Adhesion (% Failure) | (g/op) | (g/op) | (g/op) |
| $1^{st}$ pull | 0/0 | 0/0 | 0/0 |
| $3^{rd}$ pull | 0/0 | 12/0 | 18/0 |
| $5^{th}$ pull | 0/0 | 36/0 | 30/0 |
| Durability (% Failure) |  |  |  |
| 50 cycles | 15 | 20 | 5 |
| 100 cycles | 30 | 38 | 35 |
| Volume Resistivity (ohm · cm) | $6.0 \cdot 10^{13}$ | $3.0 \cdot 10^{13}$ | $2.0 \cdot 10^{14}$ |

Examples 3 to 5 show that a good volume resistivity is obtained by using an epichlorohydrin rubber along with the TPO, MA-g-PP, oxidized polyethylene wax, ATPEO, hydroxy-terminated E/EO and MA-g-PE. Moreover, the presence of an epichlorohydrin rubber does not affect paint adhesion and durability.

EXAMPLES 6–7 and

Comparative Example 3

Examples 6 and 7 show the paint adhesion, durability and volume resistivity of compositions containing a thermoplastic olefin (TPO), a maleic anhydride-grafted polypropylene (MA-g-PP), an oxidized polyethylene wax, an hydroxy-terminated ethylene/ethyleneoxide copolymer (HO-E/EO), an epichlorohydrin rubber, and a Li or Na sulfonic acid salt.

Comparative Example 3 shows the use of a Na sulfonic acid salt along with a TPO composition of the prior art, in the absence of an epichlorohydrin rubber, in order to enhance the electrical conductivity of the compositions.

The TPO, the MA-g-PP, the oxidized PE wax, the ATPEO, the HO-E/EO, the MA-g-rubber, and the antioxidant were the same as in the preceding Examples.

The Na sulfonic acid salt was 2-naphthalenesulfonic acid sodium salt (90% purity), commercially available from Aldrich (catalogue no. 10,967-3, 1996–1997), while the Li sulfonic acid salt was lithium trifluoromethanesulfonate (96% purity), also commercially available from Aldrich (catalogue no. 28,266-9, 1996–1997).

The results are shown in Table 3.

TABLE 3

|  | Ex. 6 | Ex. 7 | Comp. Ex. 3 |
|---|---|---|---|
| TPO | 100 | 100 | 100 |
| MA-g-PP | 10 | 10 | 10 |
| Oxidized PE wax | 10 | 10 | 10 |
| ATPEO | — | — | 3 |
| HO-E/EO | 4 | 4 | — |
| Epichlorohydrin rubber | 10 | 10 | — |
| MA-g-rubber | — | — | 10 |
| Antioxidant | 0.2 | 0.2 | 0.2 |
| Na sulfonic acid salt | 1 | — | 1 |
| Li sulfonic acid salt | — | 1 | — |
| Paint Adhesion (% Failure) | (g/op) | (g/op) | (g/op) |
| 1$^{st}$ pull | 0/0 | 0/0 | 2/0 |
| 3$^{rd}$ pull | 0/0 | 6/0 | 12/0 |
| 5$^{th}$ pull | 12/0 | 42/0 | 22/6 |
| Durability (% Failure) |  |  |  |
| 50 cycles | 5 | 5 | 0* |
| 100 cycles | 15 | 5 | 18 |
| Volume Resistivity (ohm · cm) | $2 \cdot 10^{12}$ | $3 \cdot 10^{13}$ | $5 \cdot 10^{15}$ |

*Measured after 25 cycles.

The results reported in Table 3 show that a good volume resistivity is obtained by using an epichlorohydrin rubber and a Na or Li sulfonic acid salt along with the TPO, MA-g-PP, oxidized polyethylene wax, ATPEO and hydroxy-terminated E/EO; moreover, the presence of an epichlorohydrin rubber does not affect paint adhesion and durability.

Furthermore, the addition of salt in a TPO composition of the prior art, in the absence of an epichlorohydrin rubber (as in Comp. Ex. 3), slightly improves the electrical conductivity of the composition, but does not give adequate paint adhesion and durability.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

I claim:
1. A composition comprising, by weight:
   (1) 100 parts of a thermoplastic olefin comprising an olefin polymer having an isotactic index of at least 80 and an olefin polymer rubber, the thermoplastic olefin having a rubber content of at least 20%;
   (2) about 5 to about 20 parts per hundred parts of the thermoplastic olefin of a propylene homopolymer or propylene copolymer with ethylene or a $C_{4-8}$ α-olefin having an ethylene or α-olefin content of about 0.5% to about 20%, grafted with an anhydride of an aliphatic α,β-unsaturated dicarboxylic acid and having an anhydride content of about 2% to about 5%;
   (3) about 3 to about 20 parts per hundred parts of the thermoplastic olefin of an oxidized polyethylene wax having a melting point of less than 116° C. and an acid number of less than 40;
   (4) a functionalized polymer that is reactive with the anhydride groups of the grafted polymers, selected from the group consisting of:
      (a) about 2 to about 6 parts per hundred parts of the thermoplastic olefin of an amine-terminated polyalkylene glycol;
      (b) about 2 to about 6 parts per hundred parts of the thermoplastic olefin of a hydroxy-terminated polyolefin,
      (c) about 2 to about 6 parts per hundred parts of the thermoplastic olefin of a hydroxy-terminated polybutadiene;
      (d) about 2 to about 8 parts per hundred parts of the thermoplastic olefin of a hydroxy-terminated olefin/alkylene oxide copolymer;
      (e) about 2 to about 8 parts per hundred parts of the thermoplastic olefin of a hydroxy-terminated polyalkylene oxide,
      (f) about 2 to about 8 parts per hundred parts of the thermoplastic olefin of a methoxy-terminated polyalkylene oxide,
      (g) about 2 to about 8 parts per hundred parts of the thermoplastic olefin of an amine-terminated olefin/alkylene oxide copolymer, and
      (h) mixtures thereof;
   (5) about 2 to about 20 parts per hundred parts of the thermoplastic olefin of an epichlorohydrin rubber;
   (6) optionally, about 5 to about 30 parts per hundred parts of the thermoplastic olefin of an olefin polymer rubber grafted with an anhydride of an aliphatic α,β-unsaturated dicarboxylic acid, having an anhydride content of at least 0.3% but less than 3% and comprising a polymer of ethylene and a $C_{3-8}$ α-olefin, optionally containing about 0.5% to about 10% of a diene, which contains about 30% to about 70% ethylene;
   (7) optionally about 5 to about 20 parts per hundred parts of the thermoplastic olefin of an ethylene polymer grafted with an anhydride of an aliphatic α,β-unsaturated dicarboxylic acid. having an anhydride content of about 1% to about 16% and a number average molecular weight $M_n$ of about 500 to about 5000, provided that at least 5 parts of anhydride-grafted polypropylene or propylene copolymer and 3 parts of oxidized polyethylene wax per hundred parts of the thermoplastic olefin are also present;
   (8) optionally about 5 to about 20 parts per hundred parts of
      (b) an hydrogenated polymer of styrene or alkyl-substituted styrene, having a number average molecular weight Mn ranging between about 600 and about 20,000; and (9) optionally about 0.1 to about 5 parts per hundred parts of the thermoplastic olefin of an organic sulfonic acid salt of a group I or II metal.

2. The composition of claim 1 wherein the thermoplastic olefin (1) is a composition comprising, by weight:
   (a) about 10% to about 60% of a propylene homopolymer having an isotactic index greater than 90, or a crystalline propylene copolymer with ethylene and/or a $C_{4-8}$ α-olefin having a propylene content greater than 85% and an isotactic index of greater than 85;
   (b) about 30% to about 60% of an amorphous ethylene-propylene or ethylenebutene copolymer, optionally containing about 1% to about 10% of a diene, which is xylene soluble at room temperature and having an ethylene content of about 30% to about 70%;
   (c) about 2% to about 20% of a semi-crystalline ethylene-propylene or ethylenebutene copolymer that is xylene insoluble at room temperature and having an ethylene content of greater than 75% but less than 92%; and
   (d) about 5% to about 20% of an ethylene polymer having a density of 0.91 to 0.96 g/cm$^3$ and a melt index of 0.1 to 100 g/10 min.

3. The composition of claim 1 wherein the thermoplastic olefin (1) is a composition comprising, by weight:
   (a) about 20% to about 70% of a crystalline propylene homopolymer having an isotactic index greater than 90, or a crystalline propylene copolymer with ethylene and/or a $C_{4-8}$ α-olefin having a propylene content greater than 85% and an isotactic index of greater than 85;
   (b) about 20% to about 75% of an amorphous copolymer of ethylene selected from the group consisting of (i) ethylene/propylene, (ii) ethylene/butene-1, (iii) ethylene/octene-1, and (iv) mixtures thereof, optionally containing about 1% to about 10% of a diene, which is xylene soluble at room temperature and has an ethylene content of about 30% to about 70%; and
   (c) about 2% to about 30% of a semi-crystalline copolymer of ethylene selected from the group consisting of (i) ethylene/propylene, (ii) ethylene/butene-1, (iii) ethylene/octene-1, and (iv) mixtures thereof, which is xylene insoluble at room temperature and has an ethylene content of greater than 90%.

4. The composition of claim 1 wherein the thermoplastic olefin (1) is a composition comprising, by weight:
   (a) at least one heterophasic polyolefin composition comprising:
      (i) about 90% to about 55% of a propylene polymer material selected from the group consisting of a propylene homopolymer having an isotactic index greater than 90, and a crystalline copolymer of propylene and an α-olefin of the formula $CH_2=CHR$, where R is H or $C_2-C_6$ alkyl, the α-olefin being less than 10% of the copolymer, and
      (ii) about 10% to about 45% of an elastomeric copolymer of propylene and an α-olefin of the formula $CH_2=CHR$, where R is H or $C_2-C_6$ alkyl, the α-olefin being about 50% to about 70% of the elastomeric copolymer, and about 10% to about 40% of the elastomeric copolymer being insoluble in xylene at ambient temperature, and
   (b) about 5 to about 50 parts per hundred parts of (a) of an elastomeric copolymer of ethylene and a $C_{3-8}$ α-olefin made with a metallocene catalyst.

5. The composition of claim 1 wherein the thermoplastic olefin (1) is a composition comprising, by weight:
   (a) about 30% to about 50% of a propylene homopolymer having an isotactic index greater than 90, and
   (b) about 70% to about 50% of an olefin polymer composition comprising:
      (i) about 25% to about 50% of a crystalline propylene homopolymer with a solubility in xylene at room temperature of less than or equal to 4%, or a crystalline copolymer of propylene with ethylene or a $C_{4-8}$ α-olefin having an ethylene or α-olefin content of about 0.5% to about 3%, and a solubility in xylene at room temperature of less than or equal to 4%, and
      (ii) about 50% to about 75% of an amorphous copolymer of ethylene and a $C_{4-8}$ α-olefin, wherein the α-olefin content is about 10% to about 20%, and the copolymer is about 10% to about 40% soluble in xylene at room temperature.

6. The composition of claim 1 wherein the thermoplastic olefin (1) is a composition comprising, by weight:
   (a) about 80% to about 30% of a propylene homopolymer having an isotactic index greater than 90, and
   (b) about 20% to about 70% of an elastomeric copolymer of ethylene and a $C_{3-8}$ α-olefin, optionally containing about 1% to about 10% of a diene, and having an ethylene content of about 30% to about 70%.

7. The composition of claim 1 wherein the anhydride of the aliphatic α,β-unsaturated dicarboxylic acid is maleic anhydride.

8. The composition of claim 1 wherein the functionalized polymer is selected from the group consisting of (a) amine-terminated polyethylene oxide, (b) hydroxy-terminated polyethylene oxide, and (c) a hydroxy-terminated ethylene/ethylene oxide copolymer.

9. The composition of claim 1 wherein the epichlorohydrin rubber is selected from the group consisting of (a) homopolymers of epichlorohydrin, (b) copolymers of epichlorohydrin with from about 1% to about 30% by mole of a saturated epoxy monomer or of an unsaturated epoxy monomer, and (c) terpolymers of epichlorohydrin with from about 1% to about 30% by mole of a saturated epoxy monomer and an unsaturated epoxy monomer.

10. A molded thermoplastic article comprising a composition as described in claim 1.

11. A molded thermoplastic automotive article comprising a composition as described in claim 1.

* * * * *